United States Patent [19]

Bordner

[11] Patent Number: 4,633,363
[45] Date of Patent: Dec. 30, 1986

[54] CONDUCTIVE FLANGED FITTING

[75] Inventor: Dalton W. Bordner, Fullerton, Calif.

[73] Assignee: Ameron, Inc., Monterey Park, Calif.

[21] Appl. No.: 762,713

[22] Filed: Aug. 5, 1985

[51] Int. Cl.⁴ .......................... H05F 3/00; F16L 11/12
[52] U.S. Cl. ........................................ 361/215; 174/47
[58] Field of Search .................. 361/212, 215, 220; 174/47, 84 S

[56] References Cited

U.S. PATENT DOCUMENTS

| | | | |
|---|---|---|---|
| 1,223,864 | 4/1917 | French | 361/215 X |
| 1,871,103 | 8/1932 | White | 361/215 X |
| 3,943,273 | 3/1976 | de Putter | 361/215 X |

Primary Examiner—L. T. Hix
Assistant Examiner—Douglas S. Lee
Attorney, Agent, or Firm—Christie, Parker & Hale

[57] ABSTRACT

A conductive flanged fitting is set forth having a conductive liner at, along and throughout the inside surface of the conduit to conduct developed static electrical charges. A portion of the liner wraps over each end of the conduit. Grounded, conductive flanges are coupled to the ends by a conductive adhesive which conducts static charges from the liner portions to the flanges and to ground.

3 Claims, 4 Drawing Figures

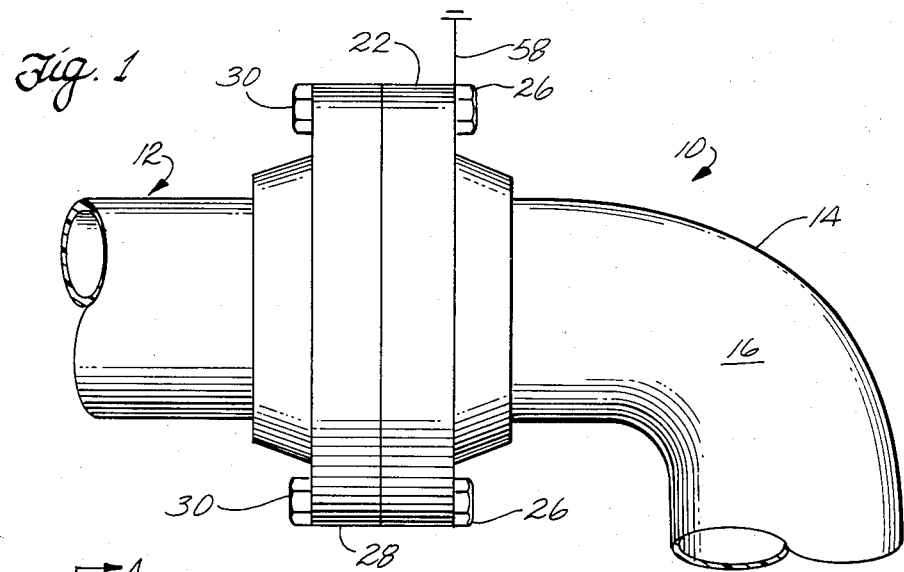
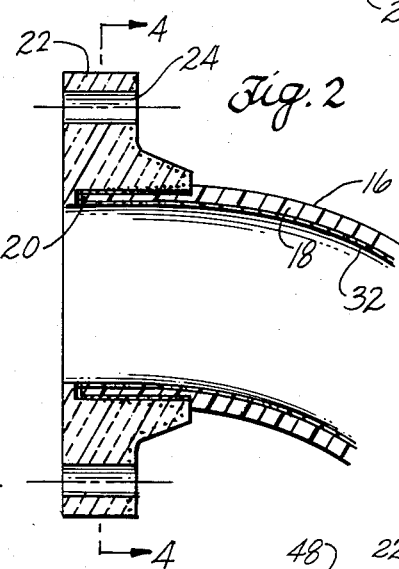
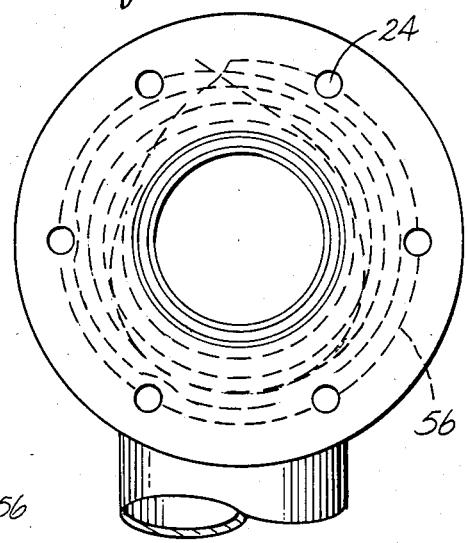
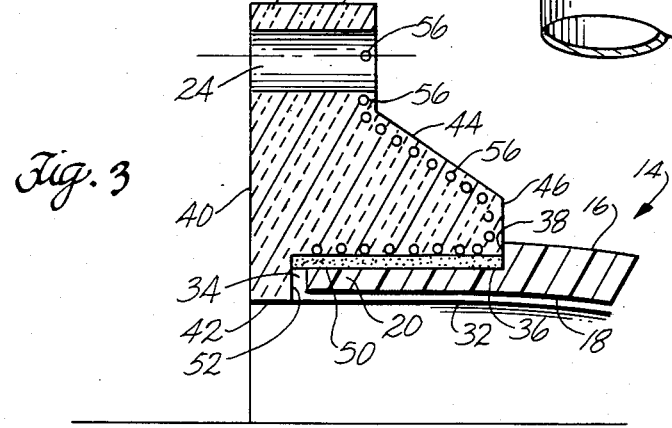

CONDUCTIVE FLANGED FITTING

FIELD OF THE INVENTION

This invention relates to pipelines wherein static electrical charges are present. More particularly, it relates to conductive fittings for the pipeline which are grounded to draw off such static charges.

BACKGROUND OF THE INVENTION

In pipelines fashioned from non-conductive pipes and fittings, static electrical charges can develop. Unless the static electrical charges are grounded, the charge may reach potentials at which arcing occurs. The spark created when the potential arcs can represent a serious danger of explosion or fire.

To ground such pipelines at least one technique has been to apply a conductive coating on the exterior of the pipes as shown in U.S. Pat. No. 3,943,273 issued Mar. 9, 1976 to de Putter entitled "Electrically Conducting Plastic Pipe System." According to this technique, the exterior of the joined pipes are coated with a conductive material and the pipe sections are joined and include conductive sealing rings. Static electrical charges pass through the coating and rings along the pipeline to a ground wire which is bonded at one or more locations along the pipeline. In one embodiment, metal strips are glued between the coated pipes and couplings to provide a conductive interconnection therebetween.

It is believed that the foregoing technique leads to an expensive piping system in that the individual pipes must be coated and the suitable interconnections must be made. Further, it is believed that the conductive coating applied to the exterior pipes is subject to damage and corrosion detracting from its ability to adequately conduct the static electrical charges to the ground.

SUMMARY OF THE INVENTION

There is, therefore, provided in the practice of the present invention a conductive flanged fitting which provides for electrical conductivity throughout the piping system. Static charges may be eliminated by grounding the system at any selected location. Unlike prior art techniques conductive rings and strips are not required. The fitting is believed to be inexpensive to manufacture and is easily grounded through a line coupled to the flange.

Toward this end, a conductive flanged fitting is provided for attachment between connections in a pipeline. The fitting, for example, may include a non-conductive conduit configured, for example, as a 90° elbow, having its ends positioned for connection of the fitting into the pipeline. The conduit has an inside surface and an outside surface. To conduct any developed static electrical charges along the length of the conduit, a conductive liner is disposed at, along and throughout the inside surface of the conduit. The liner may be bonded to the inside surface or may represent an integral portion of the conduit. For example, where the conduit is fashioned by winding resin impregnated fibers about a mandrel, the liner may consist of a resin impregnated carbon or metalized glass vail or fibers, carbon or metal filled thermoset resin or metallic foil wrapped or applied to the mandrel. At at least one and preferably both conduit ends, the liner folds over the end of the conduit. Any static electrical charges developed in the conduit will be conducted through the liner along its length to the conduit ends. The liner at the inside surface is protected from the environment and from being damaged during assembly of the pipeline.

To conduct the static charge from the liner, the fitting includes at one but preferably both ends an electrically conductive flange. For this purpose, a metal or conductive fiberglass flange may be used. The flange is shaped to be received over the conduit end. Means for conductively adhering the flange to the conduit end such as a conductive adhesive are also provided.

Accordingly, electrical continuity is maintained throughout the piping system. Static charges built-up in the piping system are conducted by the liner of the conduit or fitting through the conductive adhesive to the flanges. Via conductive bolts coupling the flanges to like flanges on adjacent conduits or fittings, the static charges are transferred to adjacent piping system components. At a selected location a grounding wire or cable grounds the static charges. In this fashion, specialized sealed rings or couplings are not required and neither are special conductive coatings.

BRIEF DESCRIPTION OF THE DRAWINGS

These and other features and advantages of the present invention will become appreciated as the same become better understood with reference to the specification, claims and drawings wherein:

FIG. 1 is a side view showing a portion of a conductive flanged fitting attached to the pipeline;

FIG. 2 is a side section view of a portion of the fitting;

FIG. 3 is an enlarged side section view of a portion of the fitting illustrating the attachment of the flange; and FIG. 4 is a section view of the fitting taken along line 4—4 of FIG. 2.

DETAILED DESCRIPTION

Turning to the drawings, FIG. 1 shows a conductive flanged fitting 10 according to the present invention coupled to a pipeline shown generally as 12. While the following description and drawings describe the fitting 10 as being an elbow, it is to be understood that the invention as hereinafter described can also be used with other fittings such as tees, straight pipe sections, or the like. Further, it is to be understood that while the following description and the drawings show only one end of the fitting it is to be understood the other end is in most instances identical.

The fitting 10 includes a non-conductive conduit 14 having an outside surface 16 and, as shown in FIGS. 2 and 3, an inside surface 18. The conduit 14 also has ends 20 only one of which is shown in the drawings. The fitting 10 also includes a conductive flange 22 including a plurality of bolt holes 24 adapted to receive bolts 26 which may be electrically conductive for coupling the flange 22 and fitting 10 to a like flange 28 for the pipeline 12. Nuts 30 cooperate with the bolts 26 for connecting the fitting 10 to the pipeline.

When fluid or gas is transported through the pipeline and fitting static electrical charges may develop. Unless grounded, these charges may build until a potential is reached at which the stored static electrical charge arcs from, for example, the fitting 10 to a nearby ground such as a pipe support or the like. In environments where flammable materials are present, the spark generated as the static electricity arcs to ground can present a serious danger of explosion or fire.

To draw off any developed static electrical charges in the fitting 10, the conduit 14 includes a conductive liner 32 disposed over and along the conduit inner surface 18 best shown in FIGS. 2 and 3. The liner 32 may consist of a metallic sleeve bonded to the inside surface of the conduit or may be fashioned as a integral part of the conduit during the manufacture thereof. For example, where the conduit is manufactured by spirally wrapping fibers about a conduit forming mandrel, the liner may consist of a resin impregnated carbon or metalized glass vail or fibers, carbon or metal filled thermoset resin or metallic foil wrapped or applied to the mandrel. The liner 32 covers the inside surface 18 and envelops the conduit end 20 to include a portion 34 overlaying the outside surface 16 adjacent the end 20. Conduit end 20 may include a recess 36 extending inwardly from the end 20 to an annular shoulder 38 to receive flange 22.

As can be appreciated, any static electrical charges developed in the conduit will be conducted by the liner 32 to the fitting end portion 34.

To ground the static electrical charges conducted by the liner 32, a conductive flange 22 is provided. Flange 22 includes an annular face 40 which, when the fitting 10 is coupled to the pipeline 12 abuts a cooperative face for the pipeline flange 28. Suitable seals or sealing compounds may be disposed between the flanges to prevent leakage. The flange 22 has an inside diameter as represented by cylindrical wall 42 (FIG. 3) selected to have a diameter to mate with the inside diameter of the liner 32.

Opposite the face 40, the flange 22 includes a conical collar 44 which tapers outwardly from an annular butt end 46 to an annular rim 48 which accommodates the bolt holes 24. Fashioned in the collar 44 from the butt end 46 is a bore 50 of a diameter slightly greater than that of the recess 36 but less than the diameter of the conduit outside surface 16. The axial length of the bore 50 is slightly greater than the axial length for the recess 36, the terminus of the bore 50 defining an annular bottom 52.

Accordingly, as shown in FIGS. 2 and 3, the flange 22 is adapted to be slipped over the conduit end 20 to a position where the butt end 46 engages the shoulder 38. In this position, the bore 50 closely receives the conduit, the conduit end 20 and liner portion 34 butting against the flange bottom 52. To attach the flange 22 conductive adhesive 54 is applied between the bore 50 and bottom 52 and in the recess 36 to securely bond the flange to the conduit 14.

As stated above, the flange 22 is conductive. To render the flange conductive, it may be fashioned from a conductive material such as metal or carbon impregnated plastic. Preferably, however, the flange 22 is fashioned from a non-metallic material such as fiberglass and includes a conductive yarn strand 56 incorporated therein which extends continuously from the bore 50 to the rim 48 to intersect the bolt holes 24. As best shown in FIGS. 3 and 4, strand 56, during the manufacture of the flange 22 is spirally wrapped along the length of the bore 50, the strand 56 being presented to be contacted by the adhesive 54. Near the butt end 46, on the flange surface, the strand 56 spirals radially outward following the contour of the butt end 46 and collar 44 to the rim 48 where the final turn of the strand 56 intersects the bolt holes 24. The strand windings wind back on each other maintaining electrical continuity even after the bolt holes have been drilled. As can be appreciated, by virtue of the conductive adhesive 54, the liner 32 and liner portion 34 are in conductive contact with the strand 56. At the bolt holes 24 the strand 56 is in conductive contact with the conductive bolts 26, nuts or washers. The bolts conduct static charges to adjacent flanges such as conductive flange 28 (FIG. 1) and to the pipeline thereby maintaining electrical continuity throughout and along the piping system. At a steel valve, pump or other component or via a grounding wire 58 attached to one of the bolts 26, static charged for the piping system are grounded.

It follows that any developed static electrical charges in the fitting 10 are conducted through the liner 32 to the portion 34 at each conduit end 20, through the conductive adhesive 54 to the strand 56 and ultimately through the bolt 26 to the piping system and to ground. The foregoing is believed to represent an advance in conductive fittings in that the components used for attaching the fitting to the pipeline are advantageously constructed to provide for electrical continuity throught he piping system for conveniently grounding static charges at one or more selected locations. Further, the conductive components of the fitting 10 are housed or concealed safely within the corrosion and damage resistant conduit 14 and flange 22.

While I have shown and described certain embodiments of the present invention, it is to be understood that it is subject to many modifications without departing from the spirit and scope of the invention set forth herein.

What is claimed is:

1. In a pipeline, a conductive flanged fitting attached at its ends to the pipeline, the fitting comprising:
    a non-conductive conduit having an inside and an outside surface;
    a conductive liner disposed along and lining the inside surface, the liner turned outwardly and disposed over one of the conduit ends;
    a grounded conductive flange secured over the one conduit end for coupling the conduit to the pipeline, the flange providing a conductive pathway to ground static charges from the liner; and
    a conductive adhesive securing the flange to the conduit one end and liner and conducting static charges therebetween.

2. The fitting of claim 1 wherein the liner is non-metallic incorporating carbon particles.

3. In a pipeline, a conductive flanged fitting attached at its ends to the pipeline, the fitting comprising:
    a non-conductive conduit having an outside surface and a conductive liner defining the conduit inside surface, the liner projecting outwardly over the conduit ends to envelop a portion of each end;
    a grounded conductive flange fitted over each conduit end; and
    conductive adhesive interposed between each flange and conduit end to secure the flange to said end and liner and to conduct electrical charges from the liner to the conductive flange and to ground.

* * * * *